(12) United States Patent
Kim et al.

(10) Patent No.: US 11,139,671 B2
(45) Date of Patent: Oct. 5, 2021

(54) WIRELESS CHARGING SYSTEM INCLUDING BOOST CONVERTER AND TRANSMISSION COIL STRUCTURE

(71) Applicant: 3M INNOVATIVE PROPERTIES COMPANY, St. Paul, MN (US)

(72) Inventors: Jinwook Kim, Gyeonggi-do (KR); Seung Youb Oh, Gyeonggi-do (KR); In-Hwan Lee, Gyeonggi-do (KR)

(73) Assignee: 3M Innovative Properties Company, St. Paul, MN (US)

( * ) Notice: Subject to any disclaimer, the term of this patent is extended or adjusted under 35 U.S.C. 154(b) by 290 days.

(21) Appl. No.: 16/480,819

(22) PCT Filed: Mar. 5, 2018

(86) PCT No.: PCT/IB2018/051400
§ 371 (c)(1),
(2) Date: Jul. 25, 2019

(87) PCT Pub. No.: WO2018/163045
PCT Pub. Date: Sep. 13, 2018

(65) Prior Publication Data
US 2019/0393712 A1    Dec. 26, 2019

(30) Foreign Application Priority Data

Mar. 6, 2017    (KR) .................. 10-2017-0028249

(51) Int. Cl.
*H02J 7/02* (2016.01)
*H02J 50/10* (2016.01)
*H01F 27/28* (2006.01)

(52) U.S. Cl.
CPC .......... *H02J 7/025* (2013.01); *H01F 27/2871* (2013.01); *H02J 50/10* (2016.02)

(58) Field of Classification Search
CPC ........ H02J 7/025; H02J 50/10; H01F 27/2871
(Continued)

(56) References Cited

U.S. PATENT DOCUMENTS

| D286,594 S | 11/1986 | Gummere |
| 6,672,216 B2 | 1/2004 | Ettmueller |

(Continued)

FOREIGN PATENT DOCUMENTS

| EP | 1224649 | 7/2002 |
| EP | 2830188 | 1/2015 |

(Continued)

OTHER PUBLICATIONS

International Search Report for PCT International Application No. PCT/IB2018/051400, dated Jun. 20, 2018, 5 pages.

*Primary Examiner* — Suresh Memula
(74) *Attorney, Agent, or Firm* — Robert S. Moshrefzadeh (57) ABSTRACT

The present invention relates to a wireless charging system including a boost converter and a transmission coil structure at a transmission side. The wireless charging system includes a boost converter 150 configured to boost a first DC voltage input to an input terminal to a second DC voltage, a DC/AC inverter 160 configured to receive the boosted second DC voltage from the boost converter to convert the received second DC voltage to AC power, and a transmission coil structure 170 which is electrically connected to the DC/AC inverter to generate a temporally variable magnetic field for wireless supplying from the AC power. The first DC voltage and the second DC voltage of the boost converter 150 may be maintained to predetermined fixed values. The transmission coil structure 170 is formed by winding a wire on a magnetic sheet many times in a spiral shape and the winding coil has a circular shape having predetermined inner radius and outer radius, a pitch, and the turn number. Further, the transmission coil structure may include a plu- (Continued)

rality of coil structures and the plurality of coil structures may have a laminated structure by connecting wires having different cross-sectional areas in series.

10 Claims, 6 Drawing Sheets

(58) Field of Classification Search
USPC .......................................................... 320/108
See application file for complete search history.

(56) References Cited

U.S. PATENT DOCUMENTS

| | | | |
|---|---|---|---|
| 6,937,125 B1 | 8/2005 | French | |
| 8,450,981 B2* | 5/2013 | Awane | H02M 3/335 |
| | | | 320/140 |
| D701,831 S | 4/2014 | Park | |
| 9,163,799 B2 | 10/2015 | Chien | |
| 2006/0083955 A1* | 4/2006 | Kanouda | G06F 1/3203 |
| | | | 429/9 |
| 2012/0154267 A1 | 6/2012 | Albano | |
| 2013/0026981 A1* | 1/2013 | Van Der Lee | H04B 5/0075 |
| | | | 320/108 |
| 2013/0033565 A1 | 2/2013 | Sandidge | |
| 2013/0285605 A1 | 10/2013 | Partovi | |
| 2014/0097790 A1* | 4/2014 | Yeh | H02J 7/00306 |
| | | | 320/108 |
| 2014/0210405 A1* | 7/2014 | Yang | H02J 7/0044 |
| | | | 320/108 |
| 2014/0336550 A1 | 11/2014 | Zedaker | |
| 2015/0028794 A1* | 1/2015 | Flett | H02J 3/381 |
| | | | 320/101 |
| 2015/0054456 A1* | 2/2015 | Yamakawa | B60L 53/126 |
| | | | 320/108 |
| 2015/0236526 A1* | 8/2015 | Jadidian | H02J 50/12 |
| | | | 320/108 |
| 2015/0331268 A1 | 11/2015 | Hohshi | |
| 2016/0001662 A1* | 1/2016 | Miller | B60L 53/122 |
| | | | 307/104 |
| 2016/0074759 A1 | 3/2016 | Kelly | |
| 2016/0215962 A1 | 7/2016 | Chien | |
| 2016/0313636 A1 | 10/2016 | Chien | |
| 2018/0294672 A1* | 10/2018 | Zhong | H01F 38/14 |
| 2018/0294742 A1* | 10/2018 | Qiu | H01F 38/14 |
| 2019/0173316 A1* | 6/2019 | Shin | H02M 3/158 |
| 2019/0326782 A1* | 10/2019 | Graham | H02J 7/025 |
| 2020/0091836 A1* | 3/2020 | Lee | H02M 7/4826 |
| 2021/0099017 A1* | 4/2021 | Parnell | H01F 27/24 |
| 2021/0211161 A1* | 7/2021 | Peralta | H02J 50/80 |

FOREIGN PATENT DOCUMENTS

| | | | |
|---|---|---|---|
| KR | 10-2012-0134030 | 12/2012 | |
| KR | 10-1305790 | 9/2013 | |
| KR | 10-1436314 | 9/2014 | |
| KR | 10-1449123 | 10/2014 | |
| KR | 10-1438880 | 11/2014 | |
| KR | 10-2015-0112160 | 10/2015 | |
| KR | 10-1593250 | 2/2016 | |
| KR | 10-1788603 | 10/2017 | |
| KR | 10-2018-0107603 | 10/2018 | |
| WO | WO 2012-169719 | 12/2012 | |
| WO | WO-2015006673 A1 * | 1/2015 | ............. B60L 53/22 |

* cited by examiner

FIG. 1

Conventional Tx coil

WIRELESS CHARGING SYSTEM INCLUDING BOOST CONVERTER AND TRANSMISSION COIL STRUCTURE

TECHNICAL FIELD

The present invention relates to a wireless charging system including a boost converter and a transmission coil structure, and more particularly, to a wireless charging system capable of improving charging efficiency for a wireless communication device and widening an effective charging range using a boost converter and a power transmission coil structure at a transmission side.

BACKGROUND ART

In general, a mobile terminal provides various functions to a user and requires a high-performance processing system and a display device to process multimedia files such as photographs, moving pictures, and music files. The processing system and the display device consume a lot of power in order to perform the functions quickly. However, since the capacity of a portable battery is limited, it is inconvenient to frequently charge the mobile terminal.

A charger for the mobile terminal is divided into a wired charging method connecting a charging cable and a wireless charging method using a phenomenon such as electromagnetic induction. Since the wired charging method interferes with the portability and free use of the mobile terminal, the use of the wireless type charger is gradually increasing.

However, a chargeable range of a commercialized wireless charger is very limited. For example, there is a problem that the charging is not performed when the mobile terminal is not accurately mounted on the wireless charger and horizontally deviates from the center of the charger or is spaced apart from the wireless charger at a predetermined distance. Furthermore, the user of the mobile terminal typically uses a protective case to protect an expensive smart phone from scratches, drop impacts, and the like. In order to properly perform the shock absorbing function, a thickness of such a protective case needs to be suitably ensured. Some protective cases may also deviate from a maximum chargeable range of conventional wireless chargers due to the thicknesses of the protective cases.

Most mobile terminals and wireless chargers thereof adopt the Qi standard of wireless power consortium (WPC), the power matters alliance (PMA) standard, and the like for compatibility between devices. According to these standards, a lot of standard transmission coils are proposed as a reference coil, and particularly, a single-layer circular spiral coil constituted by a litz wire is widely used in a WPC wireless charger. However, such a coil has a maximum charging distance of about 8 mm from the mobile terminal when an electric load is 5 V/1 A, and even if the mobile terminal horizontally deviates from the center of the wireless charger by only about 5 mm, charging efficiency is rapidly deteriorated or a problem in a charging function occurs. Accordingly, when a transmission coil of the charger and a reception coil of the mobile terminal are misaligned or a distance between the charger and the mobile terminal exceeds 1 cm, the wireless charging is not performed properly. As a result, the user of the conventional wireless charger needs to pay considerable attention when the mobile terminal is mounted on the wireless charger.

DISCLOSURE

Technical Object

In order to solve the aforementioned problems, an object of the present invention is to provide a wireless charging system with improved charging range and charging efficiency for a mobile terminal such as a smart phone.

Technical Solution

In order to increase a horizontal range in which wireless charging is performed and a vertical distance which may be maximally separated, a wireless charging system according to the present invention to achieve the object is characterized by adopting a boost converter for boosting and applying a DC voltage before a DC/AC inverter for supplying high-frequency AC power to a transmission coil and simultaneously, combining a transmission coil arrangement and dimensions different from those of the related art.

According to an exemplary embodiment of the present invention, there is provided a wireless charging system including: a boost converter configured to boost a first DC voltage input to an input terminal to a second DC voltage; a DC/AC inverter configured to receive the boosted second DC voltage from the boost converter to convert the received second DC voltage to AC power; and a transmission coil structure which is electrically connected to the DC/AC inverter to generate a temporally variable magnetic field for wireless supplying from the AC power. Further, the second DC voltage of the boost converter is maintained to a predetermined fixed value, and the transmission coil structure is formed in a circle having an inner radius $r_{in}$ and an outer radius $r_{out}$ by winding a wire on a magnetic sheet many times in a spiral shape.

In addition, the boost converter may be disposed between a power supply device disposed outside the wireless charging system and the DC/AC inverter to supply the boosted voltage to the DC/AC inverter. For example, the first DC voltage of the boost converter may be a value in a range of 3.5 to 5.1 V, preferably 4.5 V to 5.0 V, and a predetermined fixed value of the second DC voltage may be a fixed value in a range of 6 V to 7 V. The wireless charging system may particularly supply power to a wireless communication device in a contactless manner.

According to another exemplary embodiment, the transmission coil structure may include a plurality of coil structures formed by connecting wires having different cross-sectional areas in series. Further, the plurality of coil structures may include a first coil structure and a second coil structure laminated on the first coil structure, and a cross-sectional radius of a wire of the second coil structure of an upper layer may be different from a cross-sectional radius of a wire of the first coil structure of a lower layer.

Advantageous Effects

According to the wireless charging system of the present invention, it is possible to widen a chargeable vertical distance and a horizontal range as compared with a conventional wireless charger following the WPC standard. Due to the increased horizontal range, wireless charging can be performed even if the mobile terminal is not precisely mounted at a defined position on the center of the wireless charging system by the user. In addition, since the chargeable vertical distance between the wireless charger and the mobile terminal increases, wireless charging becomes pos-

BEST MODE

The present invention will be described more fully hereinafter with reference to the accompanying drawings, in which exemplary embodiments of the present invention are shown. The features of the present invention and the advantages thereof will be more apparent in the following detailed description. However, the present invention is not limited to exemplary embodiments described in the present specification, but may be embodied in many different forms. The sizes and thicknesses of the constituent elements illustrated in the drawings are arbitrarily shown for convenience of description, and the present invention is not limited to the illustrated embodiments.

Figure 1:
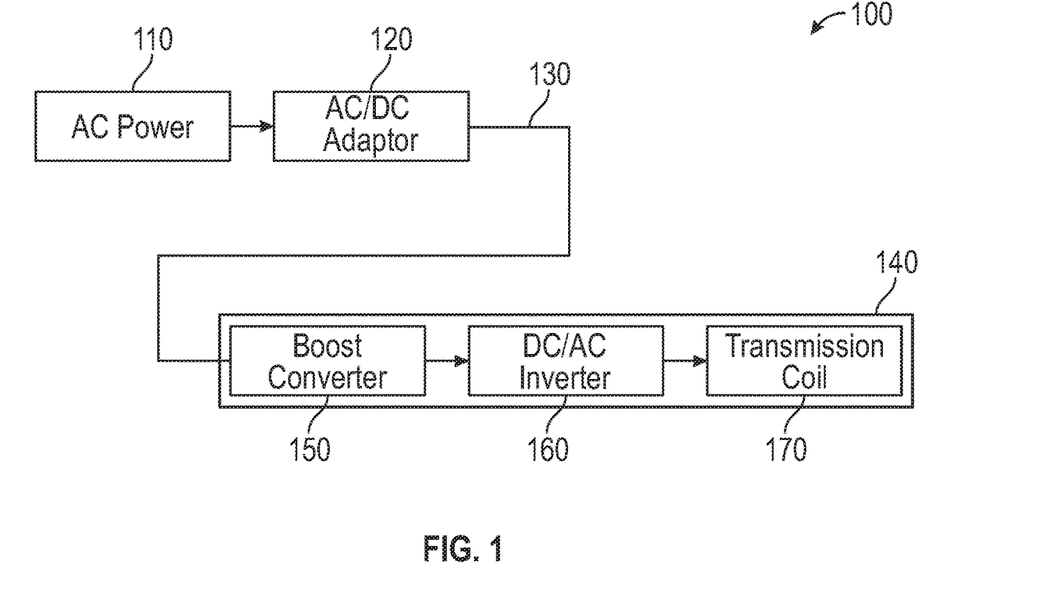
FIG. 1 is a schematic diagram of a wireless charging system and a power supply device according to the present invention.

FIG. 1 is a schematic diagram of a wireless charging system according to the present invention and a power supply device which supplies power to the wireless charging system. First, an AC/DC adapter 120 for converting AC power supplied from an AC power supply unit 110 to DC power is illustrated outside a wireless charging system 140, and predetermined DC power is supplied to the wireless charging system 140 from the AC/DC adapter 120 through a cable 130. The AC/DC adapter 120 typically functions to convert AC power of, for example, 110 V or 220 V, to a DC voltage of 5 V, and in a conventional wireless charging system, the DC power of 5 V is supplied to a DC/AC inverter in the wireless charging system as it is.

The present inventors have found that when the DC power is supplied to a higher voltage (for example, a fixed value in a range of 6 V to 7 V) using a boost converter 150 before a DC/AC inverter 160 of the wireless charging system 140, a wireless chargeable horizontal range and a vertical distance may be significantly increased. The reason is that when a high input voltage is used, Qi communication data may be generally detected well. The success of the communication becomes an important factor of determining effective charging range and distance. However, as the input voltage is increased, the charging efficiency may be deteriorated and thus, although the input voltage increases, the charging range and the charging distance are not necessarily improved.

For reference, in a Qi wireless charging system, a load modulation scheme is used for communication between a transmission unit and a reception unit. Such a method may be achieved as follows.

(1) A load impedance at the reception unit is modulated by turning on/off a capacitor or a resistor,
(2) an input current is changed by a change in load impedance,
(3) the transmission unit detects an amplitude difference of the input current, and
(4) the amplitude difference is converted to communication data by an analog-digital converter.

By considering the aspect, in the present invention, the boost converter 150 is added between the power supply device and the DC/AC inverter 160 of the wireless charging system to boost and apply an input voltage supplied from the power supply device in a range of 3.5 V to 5.1 V, preferably 4.5 V to 5.0 V (for example, the input voltage may be less than 5 V in the case of using an external battery) to a fixed value in a range of 6 V to 7 V, for example, 6 V. At the same time, the arrangement and dimension of the transmission coil are different from those of the conventional transmission coil as described below. That is, a major technical feature of the present invention is that a chargeable range is widened by combining (i) the boost converter which is disposed between the power supply device and the DC/AC inverter of the wireless charging system to boost the input voltage in the range of 3.5 V to 5.1 V, preferably 4.5 V to 5.0 V to a specific fixed value in the range of 6 V to 7 V, and (ii) the transmission coil having the arrangement and dimension set to be different from those of the conventional Qi reference coil.

Furthermore, the boost converter may supply a stabilized voltage to the wireless charger regardless of the voltage drop according to the length of the connection cable 130. Particularly, as described above, the voltage boosted to the fixed value in the range of 6 V to 7 V is supplied to the DC/AC inverter 160. The DC/AC inverter 160 generates high-frequency AC power therefrom to supply the generated high-frequency AC power to a transmission coil structure 170 which is electrically connected with the DC/AC inverter, and the transmission coil structure 170 generates a temporally variable magnetic field from the high-frequency AC power. When a reception coil structure (not illustrated) of a mobile terminal is mounted at an appropriate location facing the transmission coil structure 170, wireless supplying to charging is performed by an electromagnetic induction phenomenon.

Figure 2:
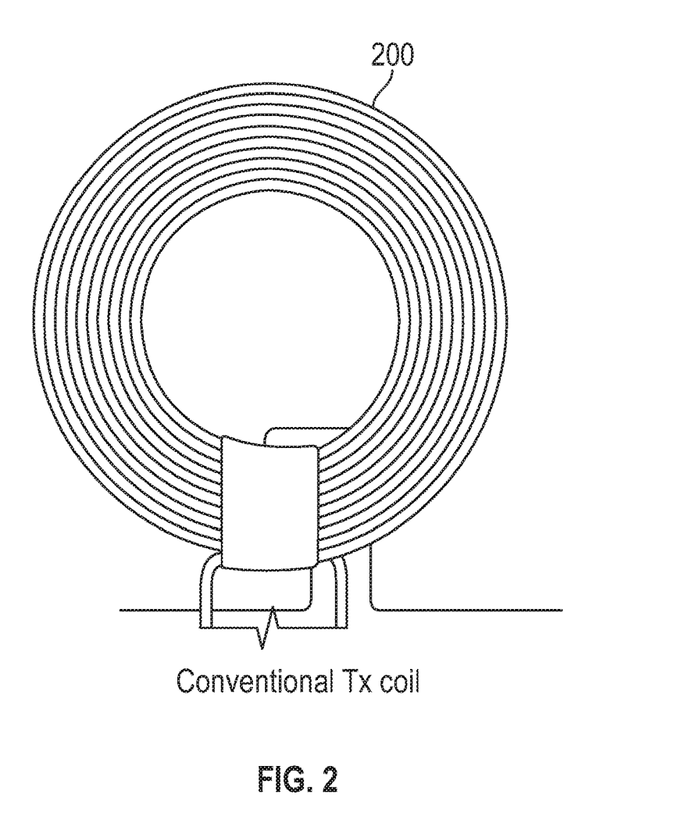
FIG. 2 is a plan view of a conventional transmission coil for wireless charging.
Figure 3:
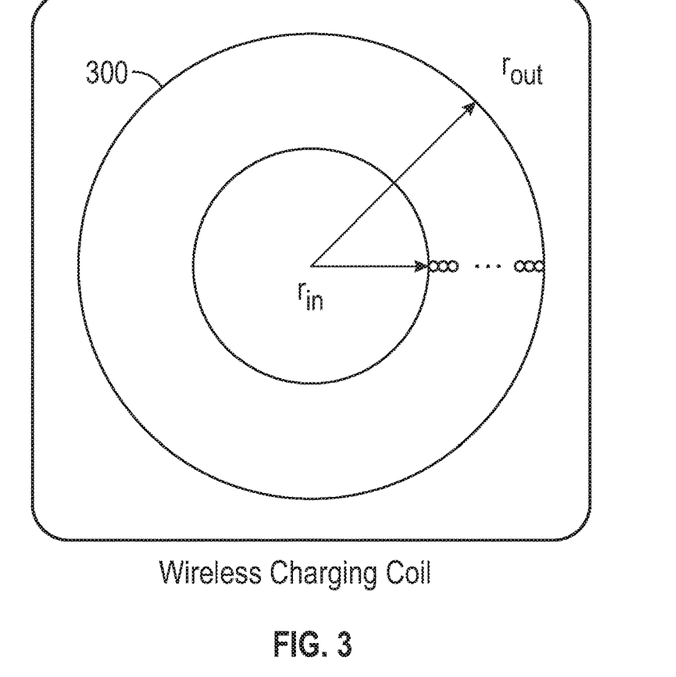
FIG. 3 is a diagram showing schematic dimensions of a wireless transmission coil.

FIG. 2 is a plan view of a Qi A11 transmission coil for wireless charging in the related art and FIG. 3 is a diagram showing schematic dimensions of a wireless transmission coil. The transmission coil illustrated in FIG. 2 is generally formed of a litz wire of 17 AWG (diameter: 1.2 mm), and an outer diameter is 45 mm and the number of winding turns is 10 times. The transmission coil is disposed on a magnetic sheet of 50 mm×50 mm having a thickness of 1.2 mm. The magnetic sheet may be, for example, a MnZn ferrite sheet.

At 150 kHz, measured values of electrical parameters of the transmission coil and the reception coil in the related art are as follows.

TABLE 1

| Coil | R | L | Q |
|---|---|---|---|
| Reference Tx coil (Qi A11 coil) (magnetic sheet: polymer of 1.2 mm) | 56 mΩ | 6.24 µH | 105.02 |
| Reference Rx coil (magnetic sheet: polymer of 0.25 mm) | 244 mΩ | 8.33 µH | 32.18 |

As shown in Table 1 above, a resistance, a self-inductance, and a Q factor of a conventional Tx coil are 56 mΩ, 6.24 µH, and 105.02, respectively, and a resistance, a self-inductance, and a Q factor of an Rx coil are 244 mΩ, 8.33 µH, and 32.18, respectively. When the vertical distance is 8 mm, a general charging range of the conventional wireless charging coil is 5 mm in a horizontal direction and a maximum allowable vertical distance is just 8 mm from the center.

In the case of using the conventional Qi A11 Tx coil, the charging range and the efficiency thereof measured according to the presence of the boost converter (boosting to 6 V) as described above are as follows.

TABLE 2

| | Vertical distance (Z) | | | |
|---|---|---|---|---|
| | 5 mm | | 8 mm | |
| Charging range (ρ) | X | Y | X | Y |
| $V_{in}$ = 5 V (using conventional coil) | 10.4 mm | 10.2 mm | 4.6 mm | 4.5 mm |
| $V_{in}$ = 6 V (combination of boost converter) | 10.9 mm | 12.0 mm | 7.6 mm | 7.9 mm |
| Charging efficiency at center | 77.3% in $V_{in}$ = 5 V 75.4% in $V_{in}$ = 6 V | | 70.4% in $V_{in}$ = 5 V 69.3% in $V_{in}$ = 6 V | |
| Maximum allowable vertical distance | 8 mm in $V_{in}$ = 5 V 10 mm in $V_{in}$ = 6 V | | | |

In Table 2, when distances in the vertical direction are 5 mm and 8 mm according to an input voltage $V_{in}$, a horizontal charging range is measured. Accordingly, it can be seen that in the case of $V_{in}$=6 V (the boost converter is disposed between the power supply device and the DC/AC inverter of the wireless charging system), the horizontal charging range is widened compared with $V_{in}$=5 V and a maximum chargeable vertical distance is increased from 8 mm to 10 mm. As a result, considerable improvement in the charging range may be made by boosting the supply voltage to 6 V using the boost converter before the DC/AC inverter.

Figure 4:
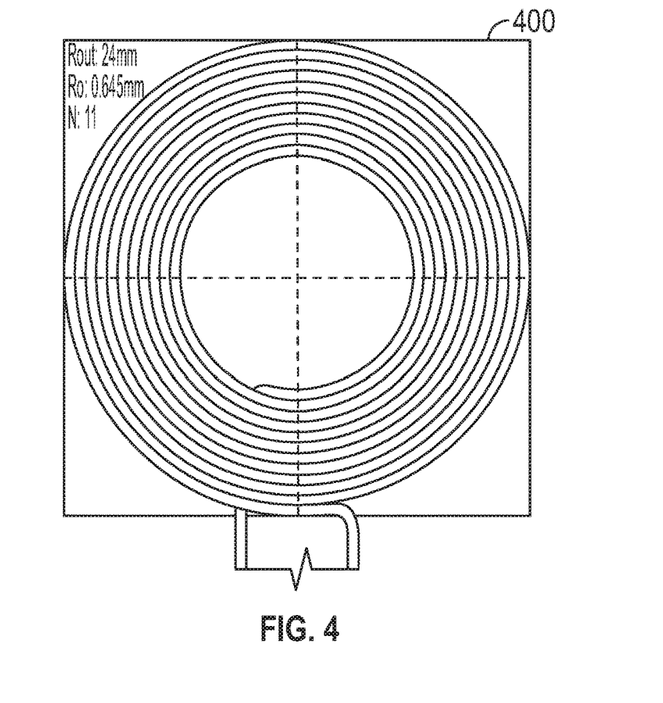
FIG. 4 is an actual plan view of a transmission coil having a predetermined dimension according to the present invention.

FIG. 4 is an actual plan view of a transmission coil structure arranged with predetermined dimensions according to an exemplary embodiment of the present invention, which may be used in combination with the boost converter described above. The illustrated coil is formed of a single layer made of a litz wire (for example, 0.08 mm/125 strands) and formed in a circle having an inter radius $r_{in}$ and an outer radius $r_{out}$ by winding the wire on the magnetic sheet many times in a spiral shape. However, the shape of the coil is not limited to the circle, and may be formed in an elliptical shape having similar dimensions or a square shape with one side of $2r_{out}$, and various different types of coils may be used as long as the similar charging range improving effect is shown.

The dimensions of the exemplary coil according to the exemplary embodiment are as follows.

TABLE 3

| Outer radius $r_{out}$ | Inner radius $r_{in}$ | Pitch p | Wire cross-sectional diameter $r_0$ | Turn number N |
|---|---|---|---|---|
| 24 mm | 9.65 mm | 1.39 mm | 0.645 mm | 11 |

The dimensions are different from the dimensions of the conventional Tx coil in FIG. 2, and the dimensions thereof are optimized to be combined with the boost converter (boosting the input voltage in the range of 3.5 V to 5.1 V, preferably 4.5 V to 5.0 V to the fixed value in the range of 6 V to 7 V) disposed between the power supply device and the DC/AC inverter 160 of the wireless charging system. The self-inductance and the resistance of the coil were measured to 7.25 µH and 22.1 mΩ at 150 kHz.

The charging range and the efficiency are obtained as follows by combining the coil having the dimensions and the boost converter (booting to 6 V).

TABLE 4

| | Vertical distance (Z) | |
|---|---|---|
| | 5 mm | 8 mm |
| Charging range (ρ) | X | X |
| $V_{in}$ = 6 V | 13.9 mm | 11.7 mm |
| Charging efficiency at center | 75.9% in $V_{in}$ = 6 V | 70.3% in $V_{in}$ = 6 V |
| Maximum allowable vertical distance | 13 mm in $V_{in}$ = 6 V | |

In comparison of test results in Table 4 and Table 2, it can be seen that when the vertical distance is Z=8 mm, the charging range of the coil was increased by more than two times as compared with the case of using the conventional coil under the condition of $V_{in}$=5 V (4.6 mm→11.7 mm) and increased by about 54% compared with the case of using the conventional coil under the condition of $V_{in}$=6 V. The maximum allowable vertical distance at the center was increased by about 62.5% compared with the case of using the conventional coil under the condition of $V_{in}$=5 V and increased by about 30% compared with the case of using the conventional coil under the condition of $V_{in}$=6 V. These test results will be further described with reference to FIGS. 7 and 8 below.

Figure 5:
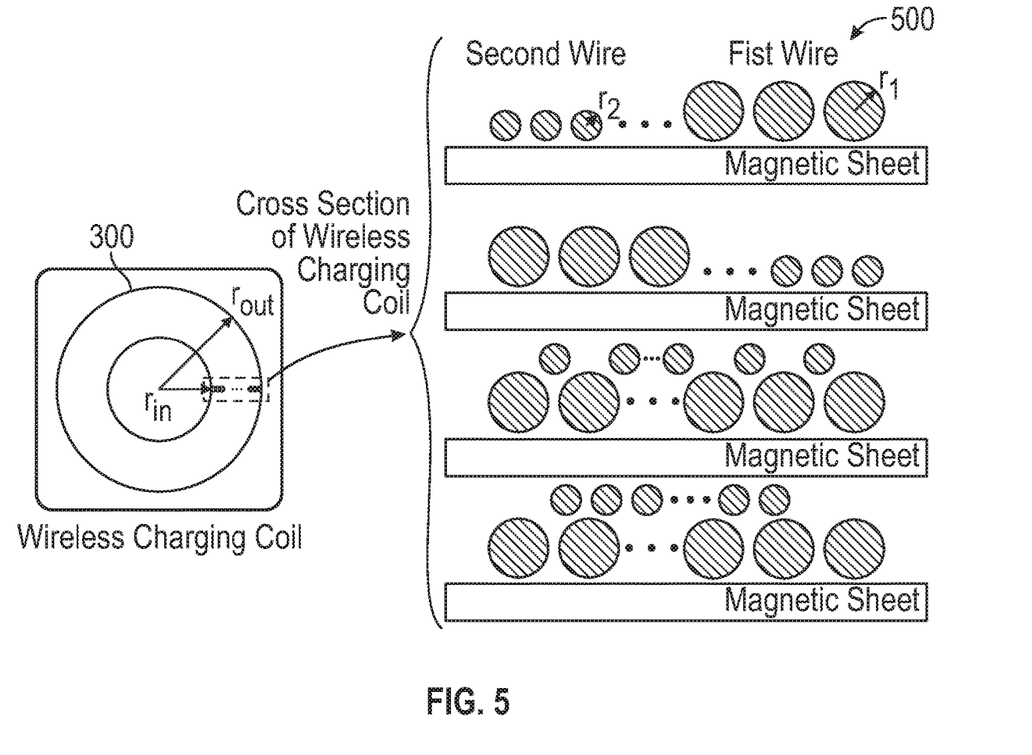
FIG. 5 is a diagram illustrating a cross section of a plurality of transmission coil structures formed by two types of wires having different cross-sectional areas.

Meanwhile, FIG. 5 illustrates a transmission coil structure in which two transmission coil structures formed of two types of wires having different cross-sectional areas are connected to each other in series and a cross section thereof. As illustrated in the cross section at the right side of FIG. 5, the two transmission coil structures may be flatly arranged on the same plane (in two upper cases) and may also be laminated on each other (in two lower cases). Particularly, in the two transmission coil structures having the laminated structure, a cross-sectional radius of the wire of the upper layer may be different from a cross-sectional radius of the wire of the lower layer. Additionally, the two coil structures may also be formed with different pitches p. As such, when the transmission coil is formed of the two types of wires, there is an advantage that magnetic patterns generated for wireless supplying may be variously adjusted by properly controlling inner and outer radii, the turn numbers, the pitches and the like of the two transmission coil structures.

Figure 6A:
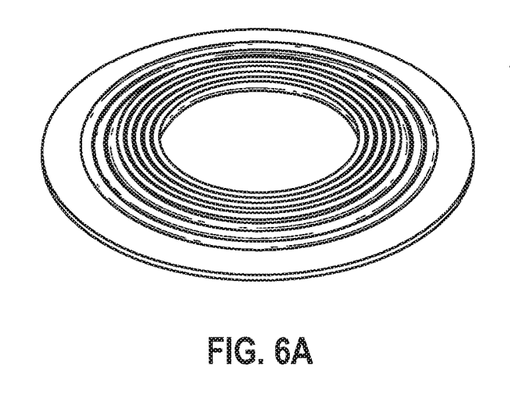
FIGS. 6A and 6B are respective perspective view and a cross-sectional view of a transmission coil structure of a laminated structure according to an exemplary embodiment of FIG. 5.
Figure 6B:
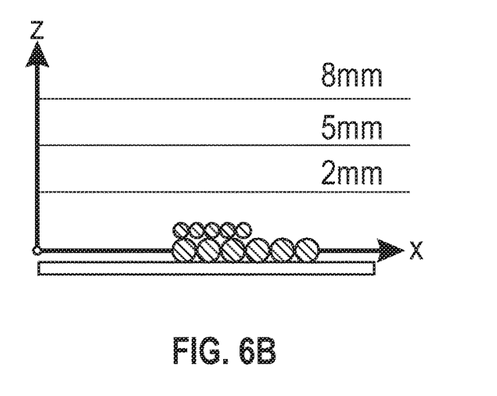

FIGS. 6A and 6B are respective perspective view and a cross-sectional view of the transmission coil structure having the laminated structure according to the exemplary embodiment of FIG. 5. The illustrated transmission coil is formed of the litz wire, and a MnZn ferrite sheet (size: 50 mm×50 mm×0.75 mm) may be used as the magnetic sheet located below the wire. The dimensions of the two laminated transmission coil structures are as follows.

TABLE 5

|  | $r_{out}$ | $r_{in}$ | p | $r_0$ | N |
|---|---|---|---|---|---|
| Lower layer | 20 mm | 12.25 mm | 1.55 mm | 1.45 mm | 6 |
| Upper layer | 16 mm | 12 mm | 1 mm | 0.45 mm | 5 |

Figure 7A:
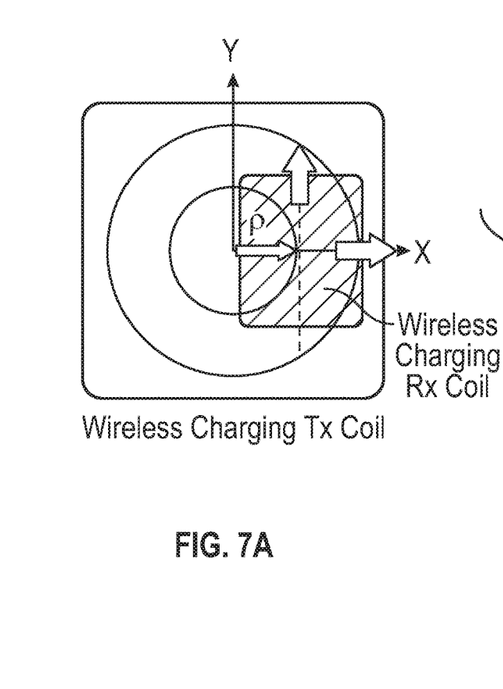
FIGS. 7A-7C illustrate performance improvement effect of a wireless charging system according to the present invention.
Figure 7B:
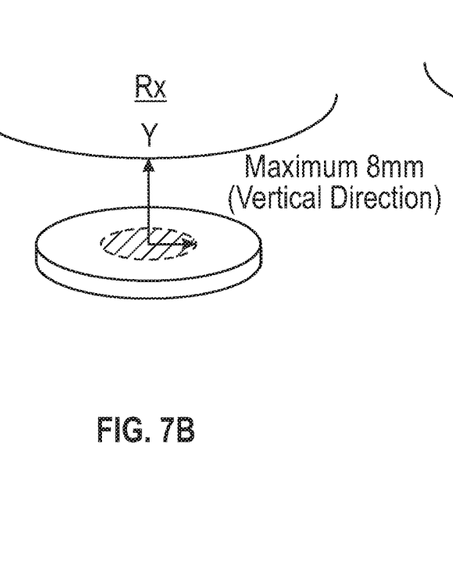
Figure 7C:
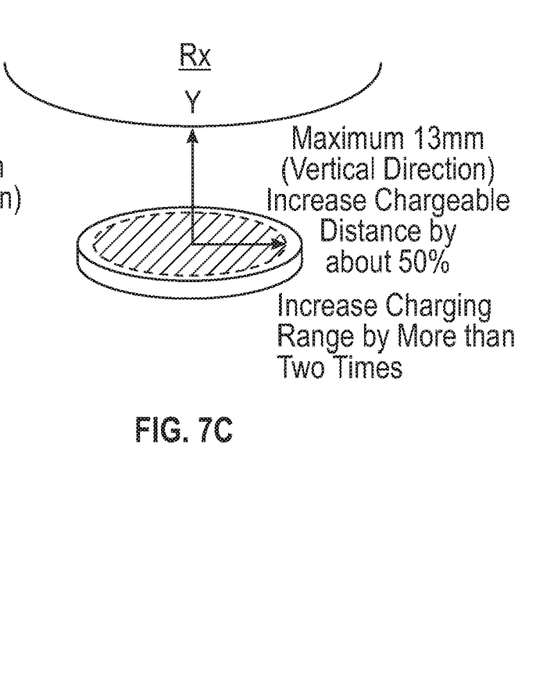

FIGS. 7A-7C illustrate performance improvement effect by comparing charging performance of wireless charging systems according to the related art and the present invention. When the electric load is $V_{out}$=5 V and $I_{out}$=1 A, the maximum horizontal charging range at which the wireless charging is successfully performed is represented by ρ. As illustrated in FIGS. 7A-7C, in a conventional wireless charging system illustrated in FIG. 7(b), a maximum chargeable vertical distance Z is 8 mm, but in the wireless charging system of the present invention illustrated in FIG. 7(c) (a combination of the boost converter and the coil structure having the dimensions of Table 3), a maximum chargeable vertical distance Z is 13 mm. In addition, a chargeable horizontal range is also increased more than two times.

Figure 8A:
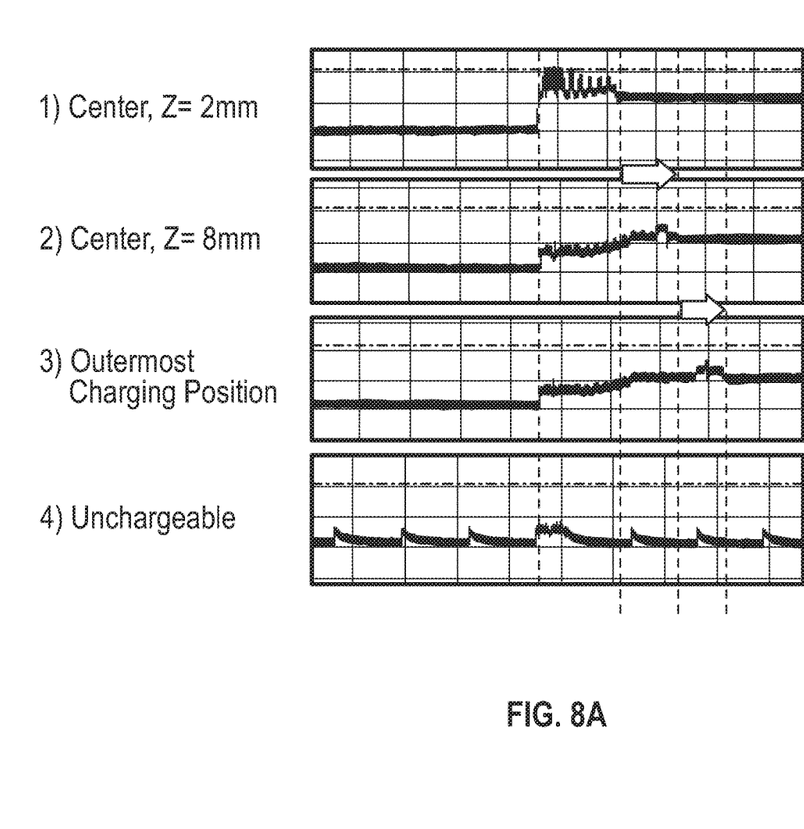
FIGS. 8A and 8B compare performance test results of a wireless charging system in the related art with a wireless charging system according to the present invention.
Figure 8B:
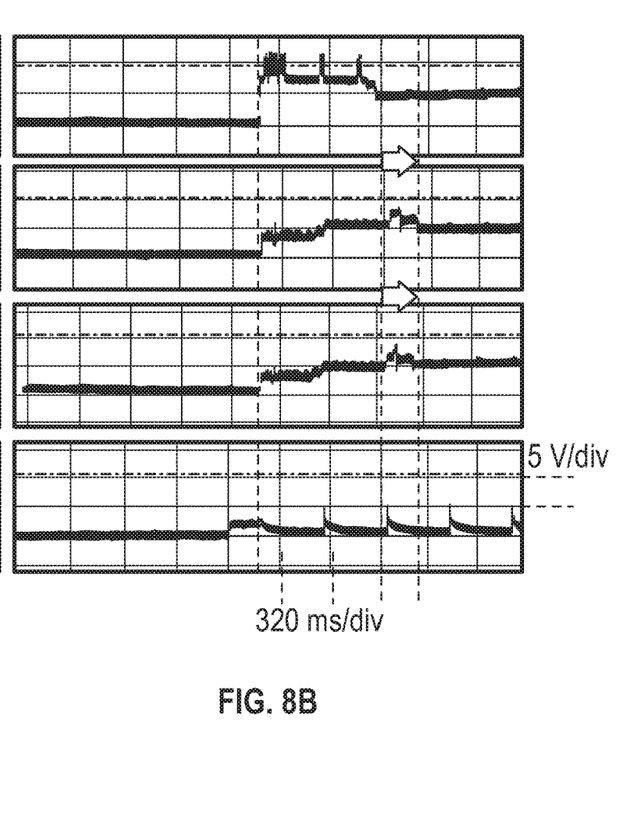

FIGS. 8A and 8B illustrate a comparison of detailed test results. For reference, this is a measurement result obtained through a measurement environment of FIG. 9. Graphs in FIGS. 8(a) and 8(b) represent communication data measured in reception circuits corresponding to the conventional wireless charging system and the wireless charging system of the present invention, respectively, and the communication data are measured at a node through a rectifier. When the transmission coil and the reception coil are strongly coupled to each other at the center, Z=2 mm, a rectified voltage rapidly enters a normal state, but as a gap between the transmission coil and the reception coil is increased, a time required for reaching the normal state is increased.

In arrow-marked portions in FIGS. 8(a) and 8(b), it can be seen that the time required for reaching the normal state in the case of the wireless charging system according to the present invention is significantly decreased as compared with the conventional wireless charging system. Further, in the wireless charging system according to the present invention, although an outermost chargeable horizontal range is much farther from the center than that of the conventional system, the less time to reach the normal state is required even in the outermost chargeable range (for example, decreased from 1.2 seconds to 1.0 second).

Figure 9:
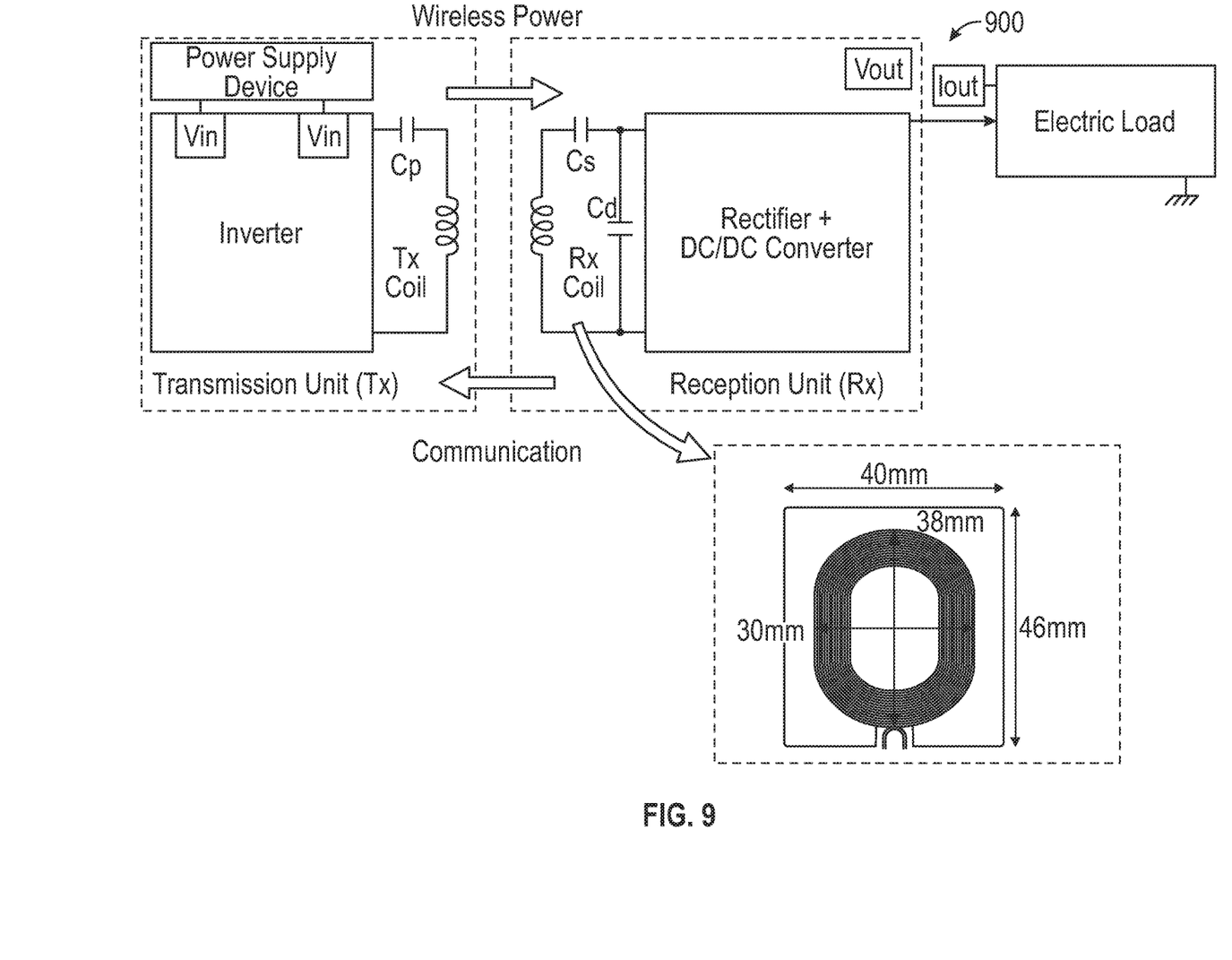
FIG. 9 is a schematic diagram illustrating a test environment for measuring charging performance of the wireless charging system.

FIG. 9 illustrates a test environment for measuring a charging range, a vertical distance, charging efficiency, and the like of the wireless charging system. As illustrated in FIG. 9, the transmission unit is constituted by a power supply unit, an inverter, a series capacitor, a transmission coil, and the like, and the reception unit is constituted by a reception coil, an impedance matching circuit, a rectifier, a DC/DC converter, an electric load, and the like. In addition, a Qi reference reception coil used for measurement is illustrated by an enlarged diagram.

As described above, in the wireless charging system according to the present invention, the boost converter is disposed between the DC power supply device and the DC/AC inverter of the wireless charging system to boost and supply the input voltage in a range of 3.5 V to 5.1 V, preferably 4.5 V to 5.0 V to a specific fixed value in a range of 6 V to 7 V. At the same time, the arrangement and dimensions of the transmission coil are set to be different from those of the conventional Qi reference coil. According to the test results, in the present invention, it is possible to significantly widen a chargeable vertical distance and a horizontal range by such a combination as compared with a conventional wireless charger following the WPC standard. Therefore, the present invention provides an advantage that normal wireless charging can be performed even when the mobile terminal slightly deviates from the center of the wireless charger or uses a thick protective case.

Hereinabove, various exemplary embodiments of the present invention have been described, but these exemplary embodiments are exemplified and the scope of the present invention is not limited thereto. It will be understood by those of ordinary skill in the art that various changes and modifications may be made with reference to the detailed description of the invention and the accompanying drawings without departing from the spirit and scope of the present invention as defined by the following claims. Therefore, it should be interpreted that the protective scope of the present invention includes not only the following claims but also equivalents thereof.

EXPLANATION OF REFERENCE NUMERALS AND SYMBOLS

110: AC power supply unit
120: AC/DC adaptor
130: Cable
140: Wireless charging system
150: Boost converter
160: DC/AC inverter
170: Transmission coil structure
200: Conventional Tx coil
300, 400: Transmission coil for wireless charging
900: Wireless charging performance measuring system

The invention claimed is:

1. A wireless charging system, comprising:
a boost converter configured to boost a first DC voltage input to an input terminal to a second DC voltage;
a DC/AC inverter configured to receive the boosted second DC voltage from the boost converter to convert the received second DC voltage to AC power; and
a transmission coil structure which is electrically connected to the DC/AC inverter to generate a temporally variable magnetic field for wireless supplying from the AC power,
wherein the second DC voltage output from the boost converter is maintained to a predetermined fixed value in a range of 6 V to 7 V, and
the transmission coil structure is formed in a circle having an inner radius $r_{in}$ and an outer radius $r_{out}$ or a square having one side of $2r_{out}$ by winding a wire on a magnetic sheet many times.

2. The wireless charging system of claim 1, wherein the boost converter is disposed between a power supply device disposed outside the wireless charging system and the DC/AC inverter to apply a predetermined boosted voltage different from a supply voltage of the power supply device to the DC/AC inverter.

3. The wireless charging system of claim 1, wherein the wireless charging system supplies power to a wireless communication device in a contactless manner.

4. The wireless charging system of claim 2, wherein the first DC voltage is a value in a range of 4.5 V to 5.0 V.

5. The wireless charging system of claim 4, wherein a cross-sectional radius $r_0$ of the wire forming the transmission coil structure is 0.645 mm, an inner radius $r_{in}$ of the winding wire is 9.65 mm, an outer radius $r_{out}$ is 24 mm, a pitch p of the winding wire is 1.39 mm, and the number of turns N of the coil is 11.

6. The wireless charging system of claim 5, wherein when the predetermined fixed value of the second DC voltage boosted by the boost converter is 6 V, (i) in the case where a vertical distance Z from the center of the transmission coil structure to a reception coil structure is 5 mm and a displacement in a horizontal direction between the center of the reception coil structure and the center of the transmission coil structure is 13.9 mm, charging efficiency at the center is 75% or more, and (ii) in the case where the vertical distance Z is 8 mm and the displacement in the horizontal direction is 11.7 mm, the charging efficiency at the center is 70% or more.

7. The wireless charging system of claim 1, wherein the transmission coil structure includes a plurality of coil structures formed by connecting wires having different cross-sectional areas in series.

8. The wireless charging system of claim 7, wherein the plurality of coil structures include a first coil structure and a second coil structure laminated on the first coil structure, and a cross-sectional radius of a wire forming the second coil structure is smaller than a cross-sectional radius of a wire forming the first coil structure.

9. The wireless charging system of claim 7, wherein the plurality of coil structures include a first coil structure and a second coil structure, and the first coil structure and the second coil structure are arranged on the same plane.

10. The wireless charging system of claim 8, wherein the first coil structure and the second coil structure are formed with different pitches.

* * * * *